United States Patent
Ling et al.

(10) Patent No.: US 10,721,250 B2
(45) Date of Patent: *Jul. 21, 2020

(54) AUTOMATIC TUNNELS ROUTING LOOP ATTACK DEFENSE

(71) Applicant: SonicWall US Holdings Inc., Santa Clara, CA (US)

(72) Inventors: Hui Ling, Shanghai (CN); Zhong Chen, Fremont, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,071

(22) Filed: Apr. 23, 2018

(65) Prior Publication Data

US 2018/0309774 A1    Oct. 25, 2018

Related U.S. Application Data

(63) Continuation of application No. 14/965,859, filed on Dec. 10, 2015, now Pat. No. 9,954,876.

(51) Int. Cl.
| | |
|---|---|
| *G06F 21/00* | (2013.01) |
| *H04L 29/06* | (2006.01) |
| *H04L 12/46* | (2006.01) |
| *H04L 12/705* | (2013.01) |
| *H04L 12/749* | (2013.01) |

(52) U.S. Cl.
CPC ...... *H04L 63/1416* (2013.01); *H04L 12/4633* (2013.01); *H04L 45/18* (2013.01); *H04L 45/741* (2013.01)

(58) Field of Classification Search
CPC . H04L 63/1408; H04L 63/1425; H04L 63/20; H04L 63/0227; H04L 63/1491
See application file for complete search history.

(56) References Cited

U.S. PATENT DOCUMENTS

| | | | |
|---|---|---|---|
| 9,954,876 B2 | 4/2018 | Shanghai | |
| 2004/0172557 A1* | 9/2004 | Nakae | H04L 63/0227 726/22 |
| 2008/0134339 A1 | 6/2008 | Kim et al. | |
| 2013/0287037 A1* | 10/2013 | Bush | H04L 43/10 370/401 |

OTHER PUBLICATIONS

U.S. Appl. No. 14/965,859 Office Action dated Jun. 22, 2017.

* cited by examiner

*Primary Examiner* — Ghazal B Shehni
(74) *Attorney, Agent, or Firm* — Polsinelli LLP

(57) ABSTRACT

The present disclosure relates to systems, methods, and non-transitory computer readable storage medium for detecting a tunnel routing loop attack on a computer network. A method of the presently claimed invention receives a packet of data over an automatic tunnel. When the received packet includes an Internet protocol version 6 (IPv6) packet headers in the received packet may be extracted from the received packet. When an extracted header is a tunnel routing loop attack (TRLA) header, address information included in the TRLA header may be matched to a destination address that the IPv6 packet is about to be tunneled through. When the address information included in the TRLA header matches the destination address that the IPv6 packet is about to be tunneled through the IPv6 packet is dropped because the match indicates that that a loop is about to be formed.

19 Claims, 6 Drawing Sheets

| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | 0 | Version 6 ||||| Traffic Class 0 |||||||||| Flow Label: 0 ||||||||||||||||||||
| 4 | 32 | Payload Length: 48 |||||||||||||||| Next Header 1: 252 |||||||| Hop Limit: 128 ||||||||
| 8 | 64 | Source: <ISTAP prefix B>::200:5efe:<IPa> 520 ||||||||||||||||||||||||||||||||
| 12 | 96 ||||||||||||||||||||||||||||||||||
| 16 | 128 ||||||||||||||||||||||||||||||||||
| 20 | 160 ||||||||||||||||||||||||||||||||||
| 24 | 192 | Destination: <ISTAP prefix A>::200:5efe:<IPb> 525 ||||||||||||||||||||||||||||||||
| 28 | 224 ||||||||||||||||||||||||||||||||||
| 32 | 256 ||||||||||||||||||||||||||||||||||
| 36 | 288 ||||||||||||||||||||||||||||||||||
| 40 | 320 | Next Header 2: 58 |||||||| Length: 0 |||||||| IPb    535 ||||||||||||||||
| 44 | 352 | IPb    535 |||||||||||||||| Padding of Zeros ||||||||||||||||
| ... | ... | ICMP Data 530 ||||||||||||||||||||||||||||||||||
| ... | ... ||||||||||||||||||||||||||||||||||

505 510 515 520 525 530 535

| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | 0 | Version 6 | | | | Traffic Class 0 | | | | | | | | Flow Label: 0 | | | | | | | | | | | | | | | | | | | |
| 4 | 32 | Payload Length: 40 | | | | | | | | | | | | | | | Next Header 1: 58 | | | | | | | | Hop Limit: 128 | | | | | | | |
| 8 | 64 | Source: <ISTAP prefix B>::200:5efe:<IPa> <br> 420 ||||||||||||||||||||||||||||||||
| 12 | 96 | ||||||||||||||||||||||||||||||||
| 16 | 128 | ||||||||||||||||||||||||||||||||
| 20 | 160 | ||||||||||||||||||||||||||||||||
| 24 | 192 | Destination: <ISTAP prefix A>::200:5efe:<IPb> <br> 425 ||||||||||||||||||||||||||||||||
| 28 | 224 | ||||||||||||||||||||||||||||||||
| 32 | 256 | ||||||||||||||||||||||||||||||||
| 36 | 288 | ||||||||||||||||||||||||||||||||
| ... | ... | ICMP Data <br> 430 ||||||||||||||||||||||||||||||||
| ... | ... | ||||||||||||||||||||||||||||||||

FIG. 4

AUTOMATIC TUNNELS ROUTING LOOP ATTACK DEFENSE

CROSS-REFERENCE TO RELATE APPLICATIONS

This application is a continuation and claims the priority benefit of U.S. patent application Ser. No. 14/965,859 filed Dec. 10, 2015, now U.S. Pat. No. 9,954,876, the disclosure of which is incorporated herein by reference.

BACKGROUND OF THE INVENTION

Field of the Invention

The present invention is generally directed to identifying attacks on a computer network. More specifically, the present invention identifies routing loop attacks on a computer network and mitigates their effect on the computer network.

Description of the Related Art

Internet protocol version six (IPv6) is destined to be the future network layer protocol for the Internet. IPv6, however, is not compatible with its predecessor, Internet protocol version four (IPv4). Because of this various interoperability mechanisms are being developed that allow computers running IPv6 stack to communicate over IPv4 networks by encapsulating IPv6 packets into IPv4 packets and sending the IPv4 packets through a tunnel. This is referred to as "IPv6-in-IPv4." This method allows IPv6 packets to be sent over an IPv4 network without prior configuration. While IPv6-in-IPv4 solves a compatibility issue between IPv6 and IPv4, it creates other issues. One such issue is that hackers or malicious programs that exploit differences or inconsistencies between IPv4 and IPv6 communication standards when attacking IPv6-in-IPv4 communications.

One type of attack that IPv6-in-IPv4 is susceptible to are packets designed to create communication loops between nodes or routers. When two different nodes continuously pass packets between themselves, network communications can slow down or crash (stop functioning). This is because as more messages loop around and around from a first node/router to a second node/router and back again, network bandwidth is consumed performing useless tasks.

In general, an IPv6-in-IPv4 tunnel has at least two end points. Each end point must be able to process both IPv4 and IPv6 packets and must possess an IPv4 address. To deliver an IPv6 packet over the tunnel, an ingress end point encapsulates the packet with an IPv4 header. The source IPv4 address is that of the ingress end point and the destination IPv4 address is that of the intended egress end point. Consequently, each tunnel end point must have a routing table that associates each IPv6 destination address with an appropriate next-hop IPv4 address. The packet is then handled by the IPv4-only network as a normal IPv4 packet. When a packet reaches the egress end point, the endpoint strips the IPv4 header from the packet and the packet may be processed as a conventional IPv6 packet.

IPv6-in-IPv4 tunnels are commonly referred to as "automatic tunnels," and automatic tunnels allow two IPv6 nodes to communicate over an IPv4-only network. These automatic tunnels are not meant to be used permanently in the network, but only during the transition from IPv4 to IPv6 networks. However, since it may take quite some time for the whole Internet to migrate from IPv4 to IPv6, automatic tunnels will exist in the network for a long period of time. Packets sent over an automatic tunnel include an egress IPv4 address that is embedded within the destination IPv6 address of the packet.

As pointed out above there is a looping vulnerability in the design of IPv6-in-IPv4 automatic tunnels. This looping vulnerability can be triggered accidentally, or exploited maliciously by an attacker. An attacker can craft a packet to be routed over a tunnel to a node that is not associated with the packet's destination. This node may forward the packet out of the tunnel to the native IPv6 network and the packet might then be forwarded back into the tunnel again by the IPv6 network, hence causing a routing loop. Conventionally, this loop terminates only when the Hop Limit field of the IPv6 packet is decremented to zero. This vulnerability can be abused as a vehicle for traffic amplification and to facilitate Denial of Service (DoS) attacks.

Without compensating security measures in place, all such automatic tunnels are vulnerable to such an attack, including, yet not limited to tunnels according to the standards such as: the Intra-Site Automatic Tunnel Addressing Protocol (ISATAP), 6to4, and 6rd (IPv6 Rapid Deployment on IPv4 Infrastructures). While some possible mitigation measures are being developed, they either impose limitations on network topology or incur a large amount of overhead for routers in a computer network. What is needed are systems and methods that prevent or limit loop attacks affecting IPv6-in-IPv4 communications using simple and efficient techniques.

SUMMARY OF THE PRESENTLY CLAIMED INVENTION

The presently claimed invention includes systems, methods, and a non-transitory computer readable storage medium for detecting a tunnel routing loop attack on a computer network. A method of the presently claimed invention receives an internet protocol version 6 (IPv6) packet at a first network device. The first network device then adds address information to the IPv6 packet that identifies a second network device in a tunnel routing attack (TRLA) header, encapsulates the IPv6 packet in an IPv4 packet, and forwards the IPv4 packet to the second network device through an automatic tunnel. At a later time the first network device receives the IPv6 packet again, identifies that a TRLA header in the IPv6 packet includes address information that identifies the second network device. Since the information in the TRLA header includes the address of the second network device, the first network device can identify that it has previously forwarded a version of the IPv6 packet. After identifying that the first network device has received and forwarded a version of the IPv6 packet, it may drop the packet.

The presently claimed invention may be implemented as a non-transitory computer readable storage medium where an IPv6 packet is received network device. A processor executing instructions out of a memory at the network device may then add address information to the IPv6 packet that identifies a second network device in a tunnel routing attack (TRLA) header, encapsulates the IPv6 packet in an IPv4 packet. The first network device may then forward the IPv4 packet to the second network device through an automatic tunnel. At a later time the first network device receives the IPv6 packet again. The processor at the first network device may then identify that a TRLA header in the IPv6 packet includes address information that identifies the second network device. Since the information in the TRLA header includes the address of the second network device, the first network device can identify that it has previously forwarded a version of the IPv6 packet. After identifying that the first network device has forwarded a version of the IPv6 packet, it may drop the packet.

A system consistent with the presently claimed invention may include a first network device that communicates with a second network device. The first network device may receive an internet protocol version 6 (IPv6) packet. The first network device then adds address information to the IPv6 packet that identifies a second network device in a tunnel routing attack (TRLA) header, encapsulates the IPv6 packet in an IPv4 packet, and forwards the IPv4 packet to the second network device through an automatic tunnel. At a later time the first network device receives the IPv6 packet again, identifies that a TRLA header in the IPv6 packet includes address information that identifies the second network device. Since the information in the TRLA header includes the address of the first network device, the first network device can identify that it has previously forwarded a version of the IPv6 packet. After identifying that the first network device has received and forwarded a version of the IPv6 packet, it may drop the packet.

BRIEF DESCRIPTION OF THE DRAWINGS

FIG. 4 illustrates an exemplary header of a loop attacking packet before the header is modified to include a tunnel routing loop attack header consistent with the presently disclosed invention.

DETAILED DESCRIPTION

The present disclosure relates to systems, methods, and a non-transitory computer readable storage medium for detecting a tunnel routing loop attack on a computer network. A method of the presently claimed invention receives a packet of data over an automatic tunnel. When the received packet includes an Internet protocol version 6 (IPv6) packet, headers in the IPv6 packet may be extracted from the received packet. When a tunnel routing loop attack (TRLA) header is extracted from the packet, address information included in the TRLA header may be matched to a destination address that the IPv6 packet is about to be tunneled through. When the address information included in the TRLA header matches the destination address that the IPv6 packet is about to be tunneled through, the IPv6 packet is dropped because the match indicates that indicates that a loop is about to be formed.

Figure 1:
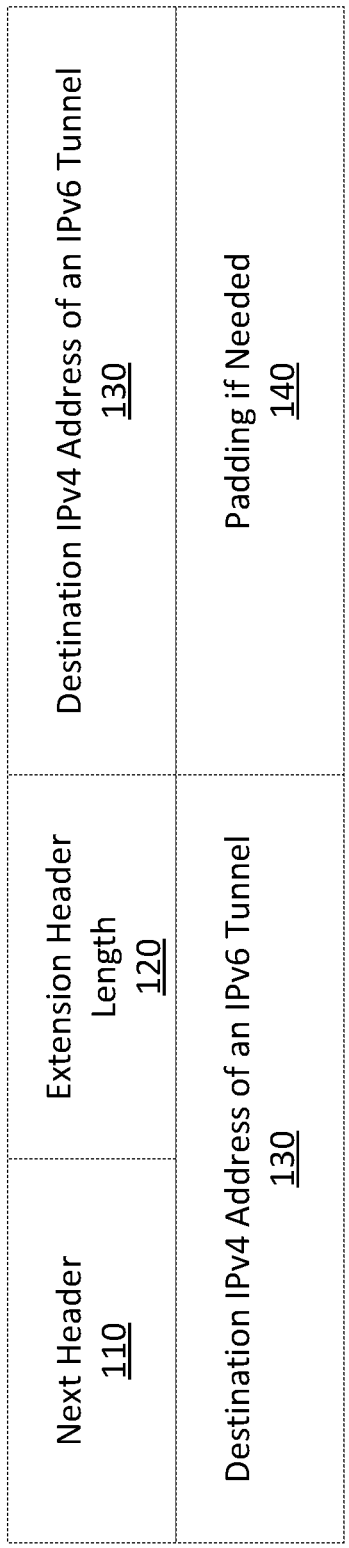
FIG. 1 illustrates an exemplary header that may be added to an internet protocol version 6 packet as that packet is routed from a first node to a second node.

FIG. 1 illustrates an exemplary header that may be added to an internet protocol version 6 packet as that packet is routed from a first node to a second node. Information in the header of FIG. 1 may be used to detect a tunnel routing loop attack (TRLA) on an internet protocol version 6 (IPv6) automatic tunnel. The header of FIG. 1 will be referred to as an IPv6 TRLA header that may be used to detect a TRLA on an IPv6-in-IPV4 automatic tunnel. The IPv6 TRLA header of FIG. 1 includes a next header 110 field, an extension header length 120 field, a destination IPv4 address of an IPv6 tunnel 130 field, and a padding field 140. The IPv4 address field of the TRLA header is used to save the IPv4 destination address of the automatic tunnel that an IPv6 packet is about to be sent through. When an IPv6 packet travels through multiple automatic tunnels during forwarding, then a destination address for each automatic tunnel that the IPv6 packet is sent through may be saved here in a list. The next header field 110 may identify or correspond to a location where a next header relating to the IPv6 packet may be found. The extension header length field 120 identifies the length of the header of FIG. 1. The IPv4 address 130 may identify IPv4 addresses of devices where the IPv6 packet previously passed through, notice in FIG. 1 that the IPv4 address 130 begins in a top row of the header and continues in the bottom row of the header. The padding field 140 may be filled with useless data (i.e. all zeros) such that other information in the header may be aligned with a particular octet of the header.

The IPv6 extension header length 120 field is a field that varies in size according to how many automatic tunnels that a particular IPv6 packet is being sent through. This field increases in size as the number of automatic tunnels that the particular IPv6 packet is sent through increases. For each automatic tunnel that an IPv6 packet is sent through, an IPv4 destination address (typically 32 bytes in length) will be appended to the TRLA header of FIG. 1. Thus, each time a header of an IPv6 packet is sent through an automatic tunnel, the length of the packet increases because the amount of data included in headers of the IPv6 packet are increased. As such, an IPv6 packet initially may contain limited header information according to a "first version" of the IPv6 packet, where the same IPv6 packet may include significantly more header information in a "later version" of the IPv6 packet.

According to the IPv6 specification, when an IPv6 packet includes multiple extension headers, each of those headers must be chained in an order where a main IPv6 header is followed by a hop-by-hop options header when a hop-by-hop options header is included in an IPv6 packet. The hop-by-hop options header may be followed by one or more destination options headers. In order to detect a TRLA as soon as possible, the IPv6 TRLA header of FIG. 1 may immediately follow a hop-by-hop options header included in an IPv6 packet. This may be accomplished by inserting the TRLA header near the beginning of the packet, immediately after a main header or the hop-by-hop header (when the packet includes a hop-by-hop header), instead of placing the TRLA header at a later point in the packet.

When a network device receives an IPv6 packet that needs to be forwarded to a destination, that network device may need to add, update, or process information in a header included with the IPv6 packet. As reviewed above, the process of adding or updating information in the header may cause the size of the IPv6 packet to increase as it is forwarded toward a destination. Before the IPv6 packet is sent through a tunnel, the size of the packet may be compared to a maximum transfer unit (MTU) size associated with the IPv6 path that the packet is configured to pass through. In instances where the size of the IPv6 packet increases to a size larger than its path MTU size, the packet may be dropped for being too large. In such an instance, a message identifying that a packet could not be delivered to the destination may be sent to the source of the IPV6 packet. In such an instance, the source (sender) of the IPv6 packet may negotiate with the destination of the IPv6 packet for a smaller MTU. This negotiation may cause the sender to add less data to the packet before the sender re-sends the packet. The sender may then send the shorter packet along a path to the destination without generating an error relating to the packet being too big.

Figure 2:
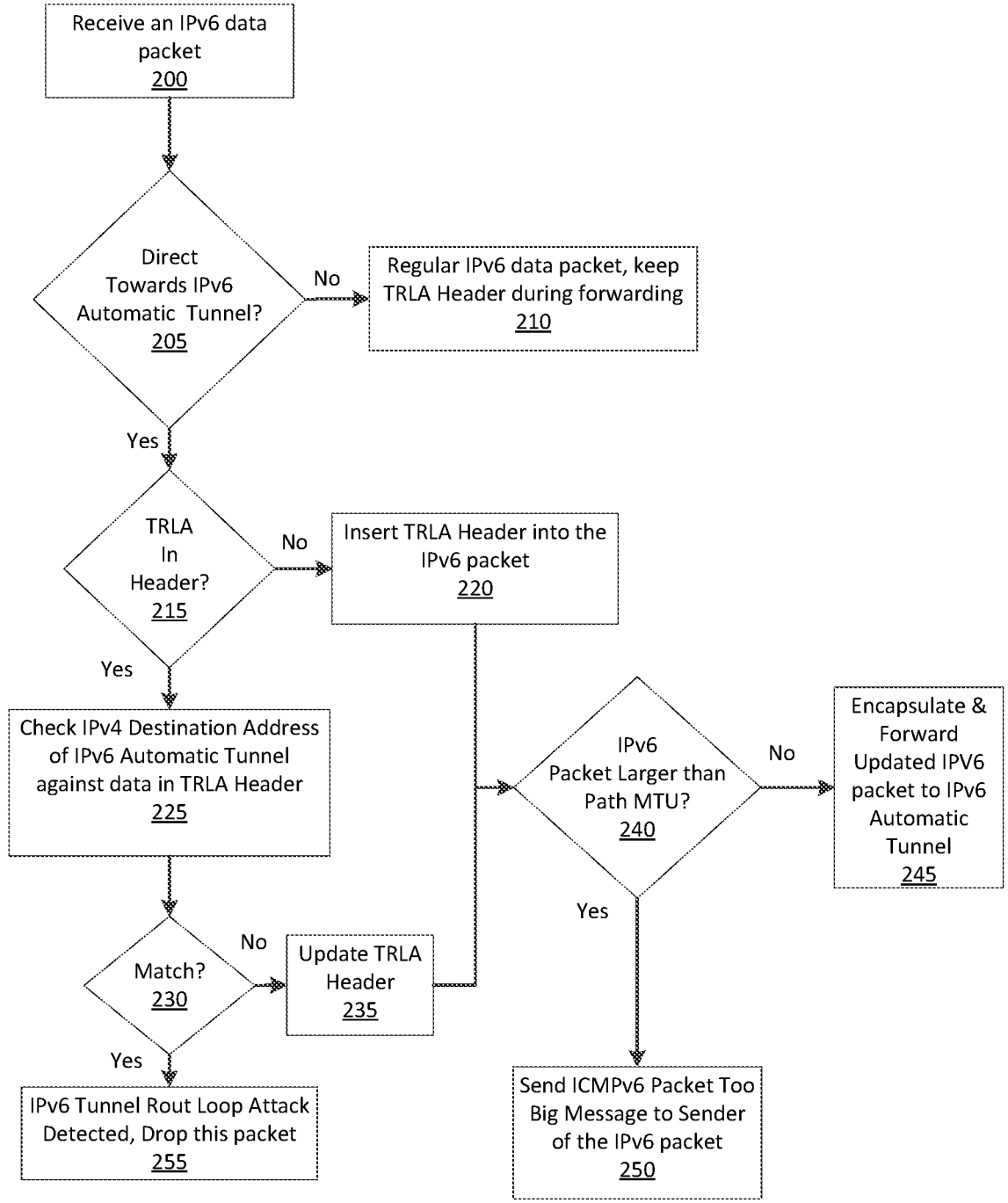
FIG. 2 illustrates an exemplary flow chart of a method for identifying that a particular IPv6 packet is related to a tunnel routing loop attack.

FIG. 2 illustrates an exemplary flow chart of a method for identifying that a particular IPv6 packet is related to a tunnel routing loop attack. FIG. 2 begins with step 200 where an IPv6 packet is received at a network device. Next step 205 determines whether the network device will pass the IPv6 packet is through an automatic tunnel, when it will not program flow moves to step 210 where the network device passes the IPv6 data packet to another network device according to IPv6 protocol. Step 210 will not need to modify the header associated with the IPv6 packet. As such, when this IPv6 packet includes a TRLA header, that TRLA header will not be modified before the network device sends the packet to the other network device in step 210 of the flow chart of FIG. 2.

When step 205 identifies that the network device will forward the IPv6 packet through an automatic tunnel, program flow moves to step 215 that identifies whether the IPv6 packet includes a TRLA header. When the IPv6 packet does not include a TRLA header, program flow moves from step 215 to step 220 where a TRLA header is inserted into the IPv6 packet.

In instances where the IPv6 packet already includes a TRLA header, program flow moves from step 215 to step 225. Step 225 compares an IPv4 destination address of an automatic tunnel with information included in the TRLA header. Next step 230 of the flow chart identifies whether the IPv4 destination address matches an address in the TRLA header. When the IPv4 destination address matches an address in the TRLA header, a TRLA loop attack is detected. Program flow then moves from step 230 to step 255 where the IPv6 packet is dropped for being associated with a TRLA loop attack.

When the IPv4 destination address does not match an address in the TRLA header in step 225, program flow moves from step 225 to step 235 where the TRLA header is updated by appending the IPv4 destination address to 130 in the TRLA header.

Note that in the flow chart of FIG. 2, program flow moves to step 240 after step 235 or after step 220. This is because step 240 checks the size of the IPv6 packet against an MTU size associated with the IPv6 path MTU between a source and a destination before sending the packet through the automatic tunnel. When step 240 identifies that the IPv6 packet is larger than the IPv6 path MTU size between the source and destination, program flow moves to step 250 where a message is sent to the sender of the packet indicating that that packet is too big to be sent over the IPv6 path. When step 240 identifies that the IPv6 packet is not larger than the IPv6 path MTU size, program flow moves to step 245 where the IPv6 packet is encapsulated and sent through the tunnel.

In the instance where a message indicating that the MTU size is too large, the sender may re-negotiate a smaller path MTU with the destination. In such an instance, a router may advertise a smaller MTU to reserve space for the TRLA header and guarantee that the IPv6 packet will be sent to a destination without generating an error relating to the packet being too big.

Figure 3:
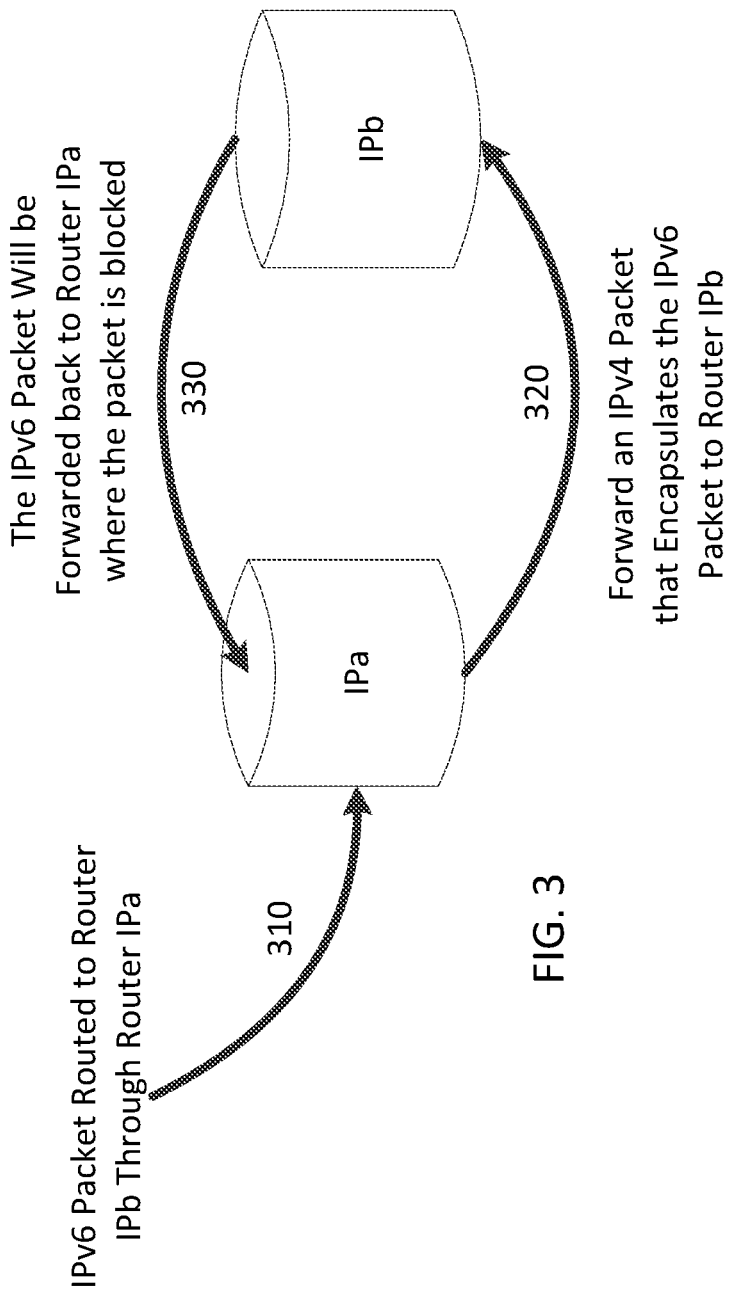
FIG. 3 illustrates a packet that will cause the packet to be looped between at least two different routers repeatedly unless the loop is identified and blocked.

FIG. 3 illustrates a packet that will cause the packet to be looped between at least two different routers repeatedly unless the loop is identified and blocked. First router IPa receives an IPv6 packet that identifies that the packet should be sent through router IPa to router IPb as indicated by line 310. After receiving the IPv6 packet, router IPa encapsulates the IPv6 packet in an IPv4 packet and sends the IPv4 packet to router IPb through an IPv4 automatic tunnel as indicated by line 320. After receiving the IPv4 packet, router IPb disassembles the IPv4 packet when extracting the IPv6 packet encapsulated in the IPv4 packet. Router IPb then identifies that the IPv6 packet addresses router IPa. Router IPb may then send the IPv6 packet through an IPv6 network back to router IPa. When router IPa receives the packet a second time, it may identify that it has previously forwarded this packet by reviewing the information in the TRLA header and drop the packet, breaking the loop. Since the TRLA header increases in size each time an IPv6 packet is sent through an automatic tunnel and since the TRLA header is part of the IPv6 packet, the IPv6 packet received the second time by router IPa may be considered a different version of the same IPv6 packet. Conventionally, IPv6 and IPv4 have no ability to identify that the packet has already been sent from and forwarded back to a router. When a TRLA header is included in the IPv6 packet a router can break the loop without a need to maintain state information about automatic tunnels.

FIG. 4 illustrates an exemplary header of a loop attacking packet before the header is modified to include a tunnel routing loop attack header consistent with the presently disclosure. Note that the header is presented in table format including columns octet 405, bit 410, and bits 0 through 31 415. Note that each 32 bits (bits 0 through 31) are associated with four octets, where each row is associated with specific octets including 32 bits. For example the row including octet 8 includes bit 64. Notice that the IPv6 header of FIG. 4 identifies internet protocol version 6, traffic class 0, a flow label of 0, a payload length of 40, a next header 1 of 58, and a hop limit of 128. This table also identifies the source of the IPv6 packet 420, a destination of the IPv6 packet 425, and payload data according to the Internet Control Message Protocol (i.e. ICMP data) 430. Each time a packet moves from one network device to another, a hop count associated with the packet may be decremented. When the hop count reaches zero the packet will be dropped and will not be routed again.

When network device/router IPa receives this IPv6 packet, that network device identifies that the IPv6 packet should be forwarded through an automatic tunnel to the destination address associated with a second network device IPb as identified from the "IPb" in the IPv6 destination address. Network device IPa then encapsulates the IPv6 packet in an IPv4 packet that is sent through an automatic tunnel according to the IPv4 protocol to network device IPb. After network device IPb receives the IPv4 packet, network device IPb removes the encapsulation and extracts the IPv6 packet. Network device IPb then identifies that the packet should be forwarded to network device IPa as indicated by the IPv6 destination address "ISTATAP<prefix A>::200:5efe:<IPb>" in the IPv6 header. The packet may then be forwarded back to network device IPa and be forwarded from IPa to IPb again, directly or through other network devices, causing a loop.

Figure 5:
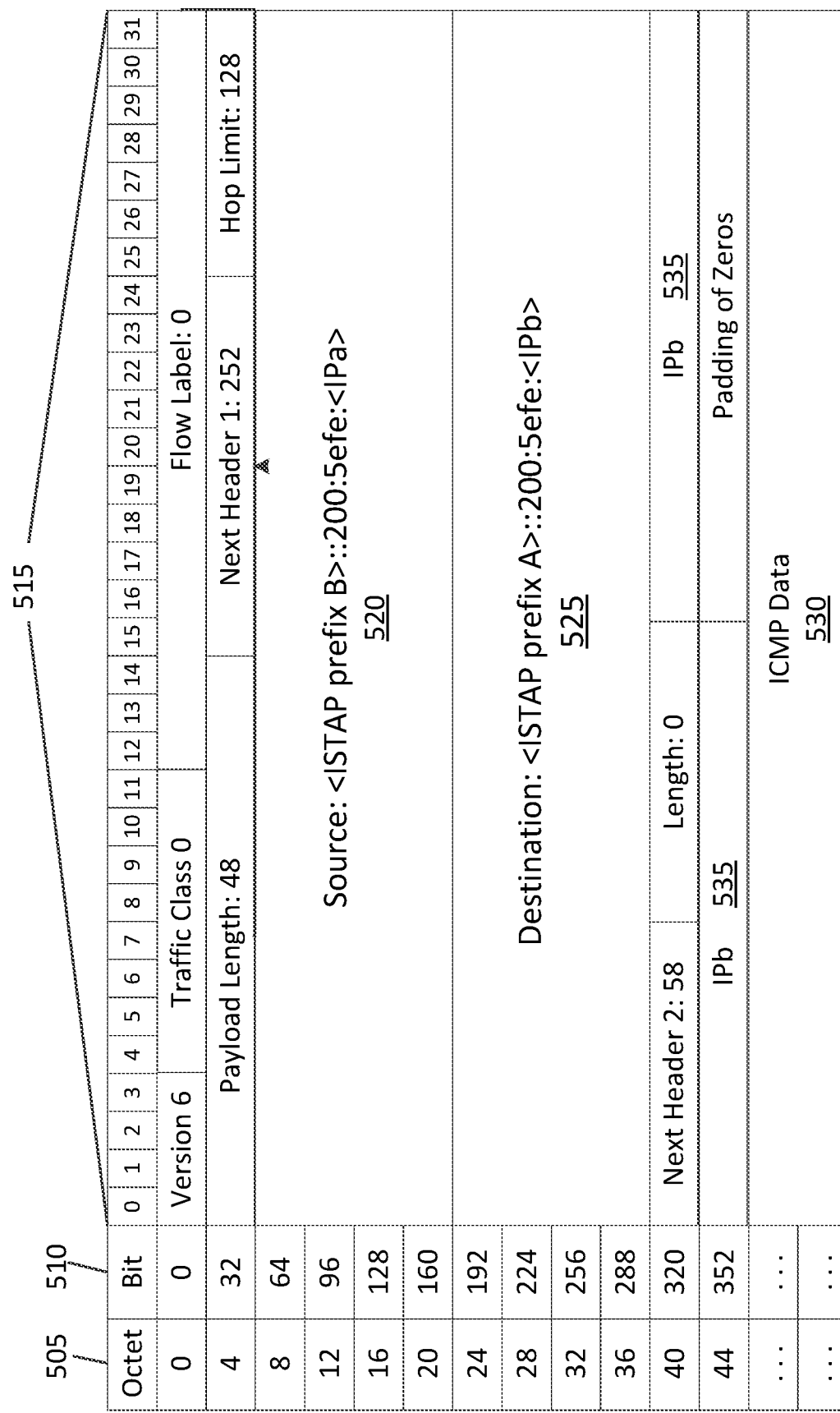
FIG. 5 illustrates an Internet protocol version 6 header that has been modified to include a tunnel routing loop attack header.

FIG. 5 illustrates an Internet protocol version 6 header that has been modified to include a tunnel routing loop attack header. Notice that FIG. 5 includes many of the same fields as the header of FIG. 4.

Here again the header is presented in table format including columns octet 505, bit 510, and bits 0 through 31 515. Note that each 32 bits (bits 0 through 31) are associated with four octets, where each row is associated with specific octets including 32 bits. Here again the header identifies internet protocol version 6, traffic class 0, a flow label of 0, and a hop limit of 128. The header of FIG. 5 includes a payload length of 48 and a next header 1 of type 252 where the payload length of FIG. 4 is 40 and the next header 1 of FIG. 4 is type 58. This table also identifies the same data ICMP 530, the same source address 520, and the same destination address 525 as shown in FIG. 4. The ICMP data 530 of FIG. 5 is located at a different octet as the ICMP data 430 of FIG. 4. This is because octets 40 and 44 of FIG. 5 include information that is not included in FIG. 4 at all.

The next header 1 of FIG. 1 includes a value of 252 because a TRLA header has been inserted after the IPv6 header in the IPv6 packet. Notice that octet 40 of FIG. 5 includes next header 2 of type 58, length 0, and a first portion of the IPb 535 field. Octet 44 includes a second portion of the IPb 535 field and a field of padded zeros. The increase in payload length of the IPv6 header from 40 in FIGS. 4 to 48 in FIG. 4 corresponds to octets 40 (an additional 4 octets) and 44 (another additional 4 octets) being added to the header of FIG. 4 as the payload length has been increased by 8 octets. This is because octet 40 adds an additional 4 octets and octet 44 adds additional 4 octets. Octet 40 including a value of 58 for next header 2 indicates that the next header 1 of FIG. 4 has been moved after an inserted TRLA header.

As described in respect to FIG. 2 and FIG. 3, a loop condition may be identified when an IPv4 destination address of an automatic tunnel matches an address included in a TRLA header of the present disclosure. Such a packet may then be dropped, breaking the loop. While FIG. 4 and FIG. 5 illustrate addressing according to the Intra-site Automatic Tunnel Addressing Protocol (ISATAP), the present invention is not limited to using the ISATAP and may be used with other tunneling protocols or addressing methods.

Figure 6:
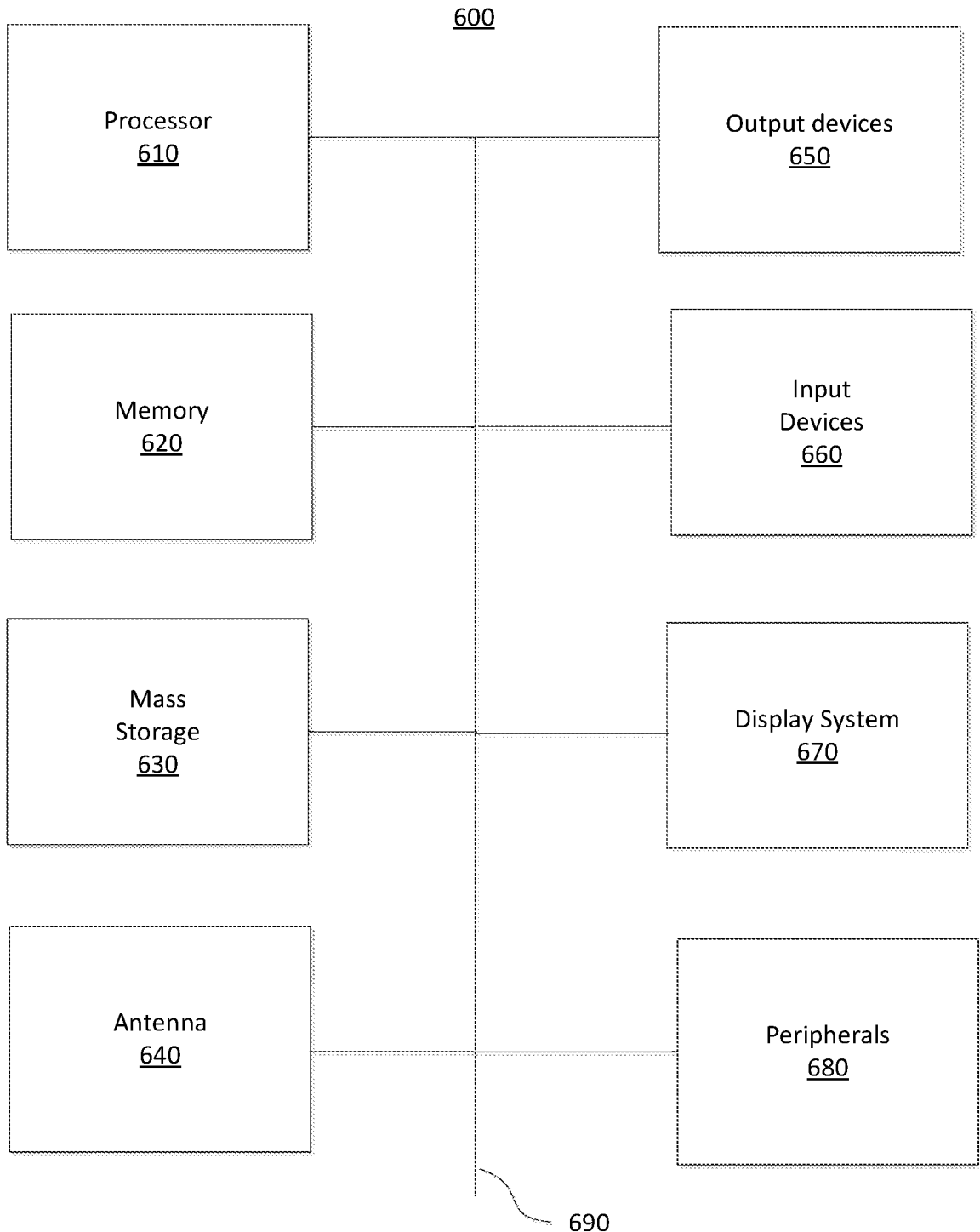
FIG. 6 is a block diagram of a device for implementing the present technology.

FIG. 6 is a block diagram of a device for implementing the present technology. FIG. 6 illustrates an exemplary computing system 600 that may be used to implement a network device for use with the present technology. The computing system 600 of FIG. 6 includes one or more processors 610 and memory 620. Main memory 620 may store, in part, instructions and data for execution by processor 610. Main memory can store the executable code when in operation. The system 600 of FIG. 6 further includes a storage 620, which may include mass storage and portable storage, antenna 640, output devices 650, user input devices 660, a display system 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the storage 630, peripheral device(s) 680 and display system 670 may be connected via one or more input/output (I/O) buses.

Storage device 630, which may include mass storage implemented with a magnetic disk drive or an optical disk drive, may be a non-volatile storage device for storing data and instructions for use by processor unit 610. Storage device 630 can store the system software for implementing embodiments of the present invention for purposes of loading that software into main memory 610.

Portable storage device of storage 630 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device.

Antenna 640 may include one or more antennas for communicating wirelessly with another device. Antenna 640 may be used, for example, to communicate wirelessly via Wi-Fi, Bluetooth, with a cellular network, or with other wireless protocols and systems. The one or more antennas may be controlled by a processor 610, which may include a controller, to transmit and receive wireless signals. For example, processor 610 execute programs stored in memory 620 to control antenna 640 transmit a wireless signal to a cellular network and receive a wireless signal from a cellular network.

The system 600 as shown in FIG. 6 includes output devices 650 and input device 660. Examples of suitable output devices include speakers, printers, network interfaces, and monitors. Input devices 660 may include a touch screen, microphone, accelerometers, a camera, and other device. Input devices 660 may include an alpha-numeric keypad, such as a keyboard, for inputting alpha-numeric and other information, or a pointing device, such as a mouse, a trackball, stylus, or cursor direction keys.

Display system 670 may include a liquid crystal display (LCD), LED display, or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other. The computer can also include different bus configurations, networked platforms, multi-processor platforms, etc. Various operating systems can be used including Unix, Linux, Windows, Macintosh OS, Palm OS, and other suitable operating systems.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for limiting packet routing in a computer network comprising a plurality of network devices, the method comprising:
   receiving a first packet at a first one of the network devices in the computer network;
   identifying that the first packet is to be forwarded to a second one of the network devices in the computer network;
   identifying that the first packet includes address information identifying that the second network device previously received a version of the first packet;
   determining that the first packet is part of a routing loop attack based on the identification that the second network device previously received the version of the first packet; and
   dropping the first packet that is determined to be part of the routing loop attack based on the identification that the second network device previously received the version of the first packet.

2. The method of claim 1, wherein the second network device previously inserted the address information identifying the second network device in a header of a packet related to the first packet.

3. The method of claim 1, further comprising:
   receiving a second packet;
   identifying that the second packet is to be forwarded through an automated tunnel;
   modifying the second packet when the second packet does not include information identifying an address associated with a previously forwarded packet related to the second packet; and
   sending the modified second packet to at least one other network device of the plurality of network devices.

4. The method of 3, further comprising:
   receiving a third packet;
   modifying the third packet to include header information;
   identifying a size associated with the modified third packet; and
   dropping the third packet based on the modified third packet exceeding a maximum packet size.

5. The method of claim 4, further comprising sending a message to a sender of the third packet identifying that a maximum length of the modified third packet exceeds the maximum packet size.

6. The method of claim 5, wherein the sender of the third packet sends a shortened version of at least one of the third packet or the modified third packet.

7. The method of claim 1, further comprising:
   receiving a second packet at the first network device;
   identifying that the second packet is to be sent to an address associated with another network device of the plurality of network devices;
   identifying that address information included in a header of the second packet matches the address associated with the other network device; and
   dropping the second packet based on the identification of the matching address.

8. A non-transitory computer-readable storage medium, having embodied thereon a program executable to perform a method for limiting packet routing in a computer network comprising a plurality of network devices, the method comprising:
   receiving a first packet at a first one of the network devices in the computer network;
   identifying that the first packet is to be forwarded to a second one of the network devices in the computer network;
   identifying that the first packet includes address information identifying that the second network device previously received a version of the first packet;
   determining that the first packet is part of a routing loop attack based on the identification that the second network device previously received the version of the first packet; and
   dropping the first packet that is determined to be part of the routing loop attack based on the identification that the second network device previously received the version of the first packet.

9. The non-transitory computer-readable storage medium of claim 8, wherein the second network device previously inserted the address information identifying the second network device in a header of a packet related to the first packet.

10. The non-transitory computer-readable storage medium of claim 8, further comprising instructions executable to:
    receive a second packet;
    identify that the second packet is to be forwarded through an automated tunnel;
    modify the second packet when the second packet does not include information identifying an address associated with a previously forwarded packet related to the second packet; and
    send the modified second packet to at least one other network device of the plurality of network devices.

11. The non-transitory computer-readable storage medium of 10, further comprising instructions executable to:
    receive a third packet;
    modify the third packet to include header information;
    identify a size associated with the modified third packet; and
    drop the third packet based on the modified third packet exceeding a maximum packet size.

12. The non-transitory computer-readable storage medium of claim 11, further comprising instructions executable to send a message to a sender of the third packet identifying that a maximum length of the modified third packet exceeds the maximum packet size.

13. The non-transitory computer-readable storage medium of claim 12, wherein the sender of the third packet sends a shortened version of at least one of the third packet or the modified third packet.

14. The non-transitory computer-readable storage medium of claim 8, further comprising instructions executable to:
    receive a second packet at the first network device;
    identify that the second packet is to be sent to an address associated with another network device of the plurality of network devices;
    identify that address information included in a header of the second packet matches the address associated with the other network device; and
    drop the second packet based on the identification of the matching address.

15. An apparatus for limiting packet routing in a computer network comprising a plurality of network devices, the apparatus comprising:
    a network interface that receives a first packet at a first one of the network devices in the computer network;

a memory; and a processor that executes instructions stored in memory, wherein execution of the instructions:

identifies that the first packet is to be forwarded to a second one of the network devices in the computer network, identifies that the first packet includes address information identifying that the second network device previously received a version of the first packet, determines that the first packet is part of a routing loop attack based on the identification that the second network device previously received the version of the first packet, and drops the first packet that is determined to be part of the routing loop attack based on the identification that the second network device previously received the version of the first packet.

16. The apparatus of claim 15, wherein the second network device previously inserted the address information identifying the second network device in a header of a packet related to the first packet.

17. The apparatus of claim 15, wherein the network interface further receives a second packet and the processor executes further instructions to:

identify that the second packet is to be forwarded through an automated tunnel; and modify the second packet when the second packet does not include information identifying an address associated with a previously forwarded packet related to the second packet, wherein the network interface sends the modified second packet to at least one other network device of the plurality of network devices.

18. The apparatus of 17, wherein the network interface further receives a third packet, and wherein and the processor executes further instructions to:

modify the third packet to include header information;

identify a size associated with the modified third packet; and drop the third packet based on the modified third packet exceeding a maximum packet size.

19. The apparatus of claim 15, wherein the network interface further receives a second packet and the processor executes further instructions to:

identify that the second packet should be sent to an address associated with another network device of the plurality of network devices;

identify that address information included in a header of the second packet matches the address associated with the another network device; and drop the second packet based on the identification of the matching address.

* * * * *